(12) United States Patent
Costello et al.

(10) Patent No.: US 11,758,275 B2
(45) Date of Patent: Sep. 12, 2023

(54) SCANNER WITH CONTROL OVER CONTEXT SWITCHING OF EXPOSURE MODES

(71) Applicant: NCR Corporation, Atlanta, GA (US)

(72) Inventors: Christopher John Costello, Suwanee, GA (US); Vreeland Phillip Tharp, Mountain View, CA (US)

(73) Assignee: NCR Corporation, Atlanta, GA (US)

( * ) Notice: Subject to any disclaimer, the term of this patent is extended or adjusted under 35 U.S.C. 154(b) by 316 days.

(21) Appl. No.: 17/036,817

(22) Filed: Sep. 29, 2020

(65) Prior Publication Data
US 2022/0103736 A1    Mar. 31, 2022

(51) Int. Cl.
*H04N 23/72*    (2023.01)
*G06K 7/10*    (2006.01)
*G06K 7/14*    (2006.01)
*H04N 23/90*    (2023.01)

(52) U.S. Cl.
CPC ......... *H04N 23/72* (2023.01); *G06K 7/10722* (2013.01); *G06K 7/1413* (2013.01); *G06K 7/1417* (2013.01); *H04N 23/90* (2023.01)

(58) Field of Classification Search
CPC .. H04N 5/2352; H04N 5/247; G06K 7/10722; G06K 7/1413; G06K 7/1417
See application file for complete search history.

(56) References Cited

U.S. PATENT DOCUMENTS

| 2018/0137319 A1* | 5/2018 | Giordano | ......... G06K 19/06037 |
| 2020/0193112 A1* | 6/2020 | Pang | .................... G06K 7/1439 |

* cited by examiner

*Primary Examiner* — Twyler L Haskins
*Assistant Examiner* — Fayez A Bhuiyan
(74) *Attorney, Agent, or Firm* — Schwegman Lundberg & Woessner, P.A.

(57) ABSTRACT

A ratio associated with capture of image frames by cameras of a scanner during short exposure mode and long exposure mode is configurable for scanner operation. Moreover, camera activation signals for the cameras are controlled during long exposure mode of the cameras to reduce illumination by illumination sources of the scanner during the long exposure mode of the cameras.

20 Claims, 3 Drawing Sheets

SCANNER WITH CONTROL OVER CONTEXT SWITCHING OF EXPOSURE MODES

BACKGROUND

Modern scanners have multiple integrated cameras and illumination sources. The cameras take short and long exposures; typically, the cameras are set to capture a same number of image frames during both the short exposures and long exposures. Context switching occurs when the cameras switch from between exposure modes (short and long).

The cameras can capture item barcodes that are illuminated during both short exposure mode and long exposure mode. The cameras can also capture barcodes or Quick Response (QR) codes displayed on a cell phone's display (such as for coupon redemption during a checkout).

However, a problem occurs during the long exposure mode while the cameras capture a code displayed on the cell phone's display. Item barcodes within the field-of-view of the cameras that are being illuminated by the illumination sources are also captured in some of the image frames along with the code captured from the cell phone's display and the item's barcode along with the cell phone displayed code are both read by the scanner. The problem is that these item codes that are read when the phone displayed code is read may not be associated with items that a customer intended to buy or may be associated with items that were already recorded for the transaction; yet, the item codes become visible and are read and recorded for the transaction by the scanner during the long exposure mode. This is confusing during checkout and, at worst, this results in customers having items in the transaction that they did not intend to buy.

As a result, modern cameras experience incorrect item barcode reads for items adjacent to the scanner during the long exposure mode while reading cell phone displayed codes. This causes transaction delays and frustration to customers performing self-checkouts and to cashiers performing assisted checkouts on behalf of customers.

SUMMARY

In various embodiments, methods and a scanner are provided for control over context switching of exposure modes.

According to an embodiment, a method for control over context switching of exposure modes for a scanner is provided. For example, cameras of a scanner are configured, such that each camera is configured to capture a first configurable number of image frames for codes during a short exposure mode of operation and a second configurable number of second image frames during a long exposure mode of operation. Further, activation signals sent to the cameras during the long exposure mode of operation are controlled.

DETAILED DESCRIPTION

Figure 1:
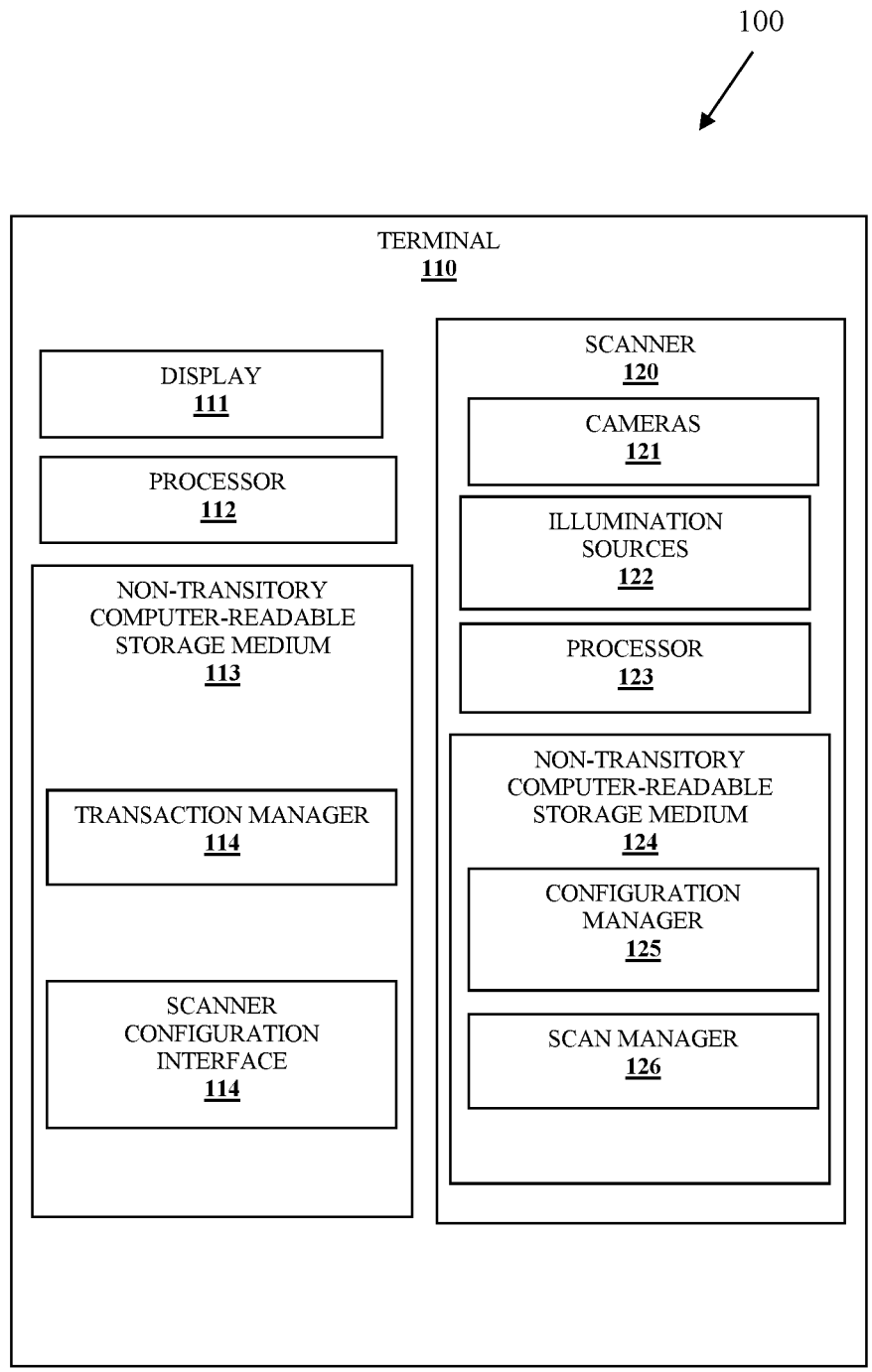
FIG. 1 is a diagram of a system for control over scanner context switching of exposure modes, according to an example embodiment.

FIG. 1 is a diagram of a system 100 for control over scanner context switching of exposure modes, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of control over scanner context switching of exposure modes, presented herein and below.

Furthermore, the techniques and the systems presented herein and below (for control over scanner context switching of exposure modes) may include all or some combination of the components shown with the system 100. The methods are programmed as executable instructions in memory and/or non-transitory computer-readable storage media and executed on one or more processors associated with the components/devices.

Specifically, the system 100 includes a terminal 110 and a scanner 120. The terminal 110 comprises a display 111, a processor 112, and a non-transitory computer-readable storage medium 113. Medium 113 comprises executable instructions for a transaction manager 114 and a scanner configuration interface 114. The scanner 120 comprises cameras 121, illumination sources 122, a processor 123, and a non-transitory computer-readable storage medium 124. Medium 124 comprises executable instructions for a configuration manager 125 and a scan manager 126.

The corresponding executable instructions when executed by the corresponding processors from the corresponding mediums cause the corresponding processors to perform operations defined herein and below with respect to transaction manager 114, scanner configuration interface 115, configuration manager 126, and scan manager 126.

Scanner 120 is a peripheral device of terminal 110 connected over a wired or wireless connection.

As will be demonstrated more clearly herein and below, system 100 permits custom setting of the number of frames captured during each exposure mode (short exposure mode and long exposure mode) by cameras 121 before context switching occurs (switching from one exposure mode to the other exposure mode). Furthermore, by controlling when the cameras 121 are activated for long exposure mode relative to activation of the illumination sources 122, system 100 is able to ensure that cell phone displayed codes are captured by the cameras 121 while also ensuring that other item codes not intended to be read but on items within the field of view of some of the cameras 121 are not inadvertently captured and read by scan manager 126 and recorded for a transaction by transaction manager 114. This control over the context switching and the long exposure mode provides sufficient precision to ensure cell displayed codes are read without also capturing item codes while maintaining item code reading accuracy for both short and long exposures when item codes are being captured by cameras 121 of scanner 120.

Typically, cameras of scanners capture a predefined number of image frames during short exposures (short exposure mode) and long exposures (long exposure mode). Typically, this is not a configurable by the terminal operator; rather, it is set. Moreover, the number of frames captured during the short exposure mode is equal to the number of frames that are captured during long exposure mode. Generally, the number of frames captured per camera during short exposure mode is 3 to 4 and the number of frames captured per camera during long exposure mode is the same 3 to 4 frames. When illumination sources are activated during the long exposure modes and a mobile device displayed code (barcode or QR code) is being imaged by the cameras, item barcodes for items adjacent to the scanner are frequently imaged. Because there is no ability to custom reduce the number of long exposure frames captured during a context switch (from short exposure mode to long exposure mode), the problem can be exacerbated. Furthermore, because there is no control over when the cameras are activated for long exposure mode with respect to the illumination sources, the probability of capturing the unintended item barcodes adjacent to the scanner increases.

These problems are solved for modern scanners with the scanner 120 and scan manager 126.

Firstly, configuration manager 125 permits configuration of a total number of image frames for capture by each camera 121 during a context switch from short to long exposures, such that a short exposure number of frames captured by each camera 121 can be different from a long exposure number of frames. This allows the number of long exposure mode frames to be reduced substantially relative to the number of short exposure mode frames, which in and of itself reduces the probability that inadvertent item barcodes are captured by the cameras 121, since the total number of long exposure mode image frames are reduced. Furthermore, the number of short exposure image frames captured can remain sufficiently high enough to ensure that both intended item barcodes and mobile device displayed codes can still be read.

In an embodiment, an optimal context switching of exposure modes for scanner 120 is set as 5 short exposure frames and 1 long exposure frame (5-1).

Scanner configuration interface 114 allows an operator of terminal 110 to custom set the context switching of exposure modes through interaction with configuration manager 125.

In an embodiment, a configuration barcode or QR code can be presented from printed media or from a mobile device display to cause configuration manager 125 to activate scanner configuration interface 114 on terminal 110. Once activated, an operator of terminal 110 can set the frames ratio for the context switching exposure modes.

In an embodiment, scanner configuration interface 114 is activated on powerup or boot of terminal 110 and available for selection by an operator during transactions through a transaction interface and/or system tray of terminal 110.

Scan manager 126 accepts as a configuration parameter a custom set ratio of short exposure frames to long exposure frames for cameras 121 during context switching of exposure modes.

Secondly, scan manager 126 controls when the cameras 121 are activated relative to activation of the illumination sources 122 for long exposure mode to minimize illumination from the illumination sources 122 during long exposure image frame capture by cameras 121. When illumination sources 121 are activated interrupts are provided that identify the rising edge of illumination and a falling edge of illumination, scan manager 126 activates the cameras 121 on the falling edge of illumination interrupt.

The existing frequency/rate of activation for the illumination sources remains unchanged, since this rate can be noticed and be an irritant to an operator of terminal 110 and the existing frequency/rate is set for optimal comfort of a terminal operator. Thus, scan manager 126 controls when cameras 121 are activated for long exposure image frame capture by sending camera activation signals to the cameras on the interrupt associated with the falling edge of illumination for the illumination sources. As a result, an operator of terminal 110 is unaware of and experiences no discomfort with the teachings provided herein because the frequency/rate of illumination source activation remains unchanged.

System 100 provides a novel scanner configuration interface 114 on transaction terminal 110 along with a novel scanner 120 comprising configuration manager 125 and scan manager 126, which allows customization of a ratio between short exposure frames and long exposure frames for context switching of exposure modes. Moreover, scan manager 126 controls when cameras 121 are activated for long exposure mode image frame capture without altering an existing rate at which the illumination sources 122 are activated by sending activation signals to cameras 121 on a falling edge of illumination interrupt. This results in no performance degradation for item barcode reading by scanner 120 and results in no performance degradation for mobile device displayed code reading by scanner 120 while eliminating the problem associated with inadvertent or unintended item barcode reading by scanner 120 during long exposure mode for cameras 121 when mobile device displayed codes are being read by scanner 120.

In an embodiment, scanner 120 is a bioptic scanner comprising three cameras 121 with two of the three cameras 121 situated in the vertical tower of scanner 120.

In an embodiment, terminal 110 is a Self-Service Terminal (SST), a Point-Of-Sale (POS) terminal, or a kiosk.

In an embodiment, the mobile device that displays a code for reading by scanner 120 comprises: a phone, a tablet, or a wearable processing device. In an embodiment, the code is a barcode or a QR code.

These and other embodiments are now discussed with reference to FIGS. 2-3.

Figure 2:
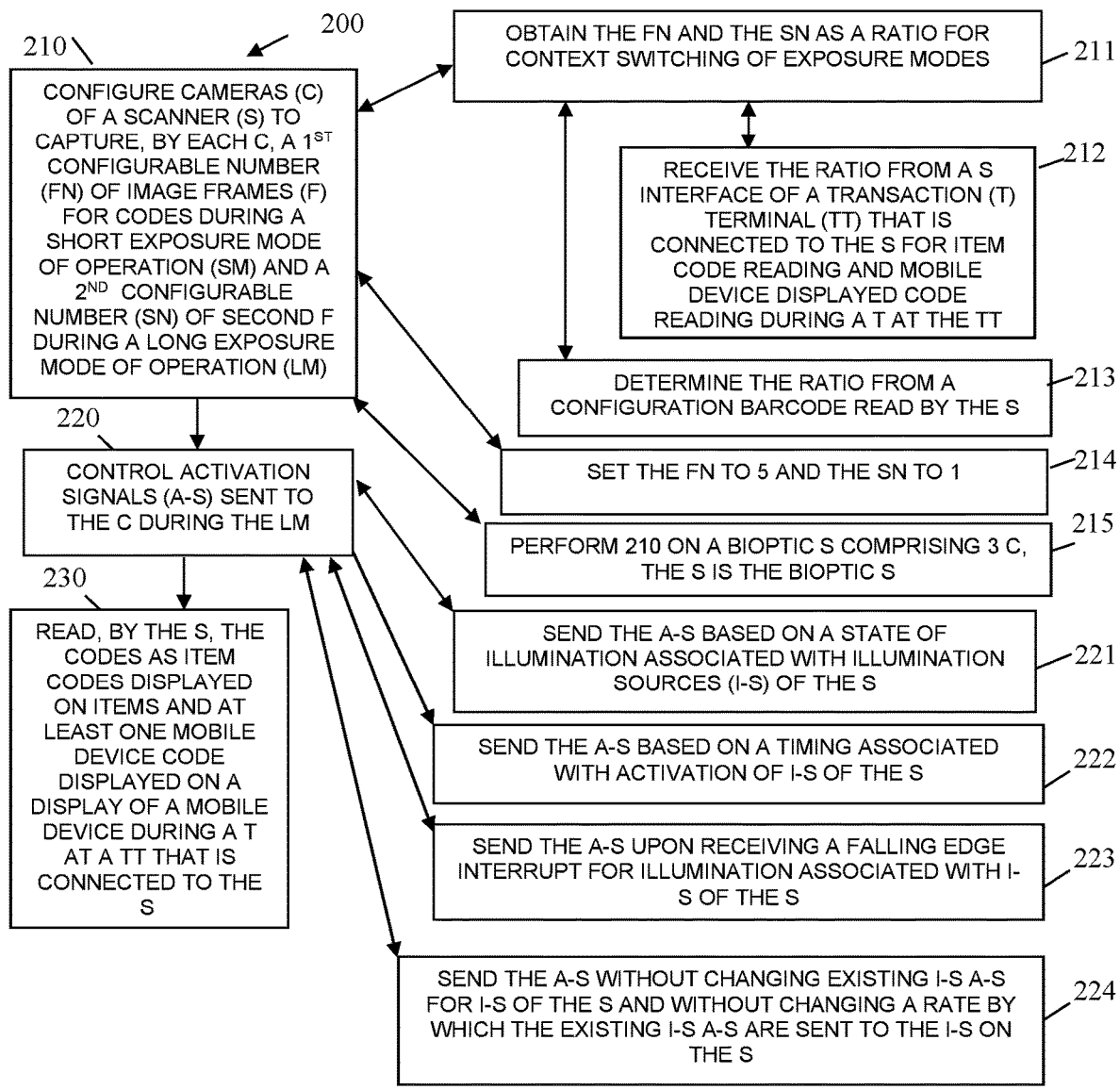
FIG. 2 is a diagram of a method for control over scanner context switching of exposure modes, according to an example embodiment.

FIG. 2 is a diagram of a method 200 for control over scanner context switching of exposure modes, according to an example embodiment. The software module(s) that implements the method 200 is referred to as a "context switching scanner control manager." The context switching scanner control manager is implemented as executable instructions programmed and residing within memory and/or a non-transitory computer-readable (processor-readable) storage medium and executed by one or more processors of a device. The processor(s) of the device that executes the context switching scanner control manager are specifically configured and programmed to process the context switching scanner control manager. The context switching scanner control manager may or may not have access to a network during its processing. Any network connection can be wired, wireless, or a combination of wired and wireless.

In an embodiment, the device that executes the context switching scanner control manager is the scanner 120.

In an embodiment, the context switching scanner control manager is configuration manager 125 and/or scan manager 126.

At 210, the context switching scanner control manager configures cameras of a scanner to capture, by each camera, a first number of configurable image frames for codes during a short exposure mode of operation and a second number of second image frames during a long exposure mode of operation.

In an embodiment, at 211, the context switching scanner control manager obtains the first number and the second number as a ratio for context switching of exposure modes.

In an embodiment of 211 and at 212, the context switching scanner control manager receives the ratio from a scanner interface of a transaction terminal that is connected to the scanner for item code reading and mobile device displayed code reading during a transaction at the transaction terminal.

In an embodiment of 211 and at 213, the context switching scanner control manager determines the ratio from c configuration barcode read by the scanner.

In an embodiment, at 214, the context switching scanner control manager sets the first number to 5 and the second number to 1 (ratio=5:1).

In an embodiment, at 215, the context switching scanner control manager performs 210 on a bioptic scanner comprising 3 cameras (the scanner is the bioptic scanner).

At 220, the context switching scanner control manager controls activation signals sent to the cameras during the long exposure mode of operation.

In an embodiment, at 221, the context switching scanner control manager sends the activation-signals based on a state of illumination associated with illumination sources of the scanner.

In an embodiment, at 222, the context switching scanner control manager sends the activation signals based on a timing associated with activation of illumination sources of the scanner.

In an embodiment, at 223, the context switching scanner control manager sends the activation signals upon receiving a falling edge interrupt for illumination associated with illumination sources of the scanner.

In an embodiment, at 224, the context switching scanner control manager sends the activation signals without changing existing illumination source activation signals for illumination sources of the scanner and without changing a rate by which the existing illumination source activation signals are sent to illumination sources on the scanner.

In an embodiment, at 230, the context switching scanner control manager reads, on the scanner, the codes as item codes displayed on items and at least one mobile device code displayed on a display of a mobile device during a transaction at a transaction terminal, which is connected to the scanner.

Figure 3:
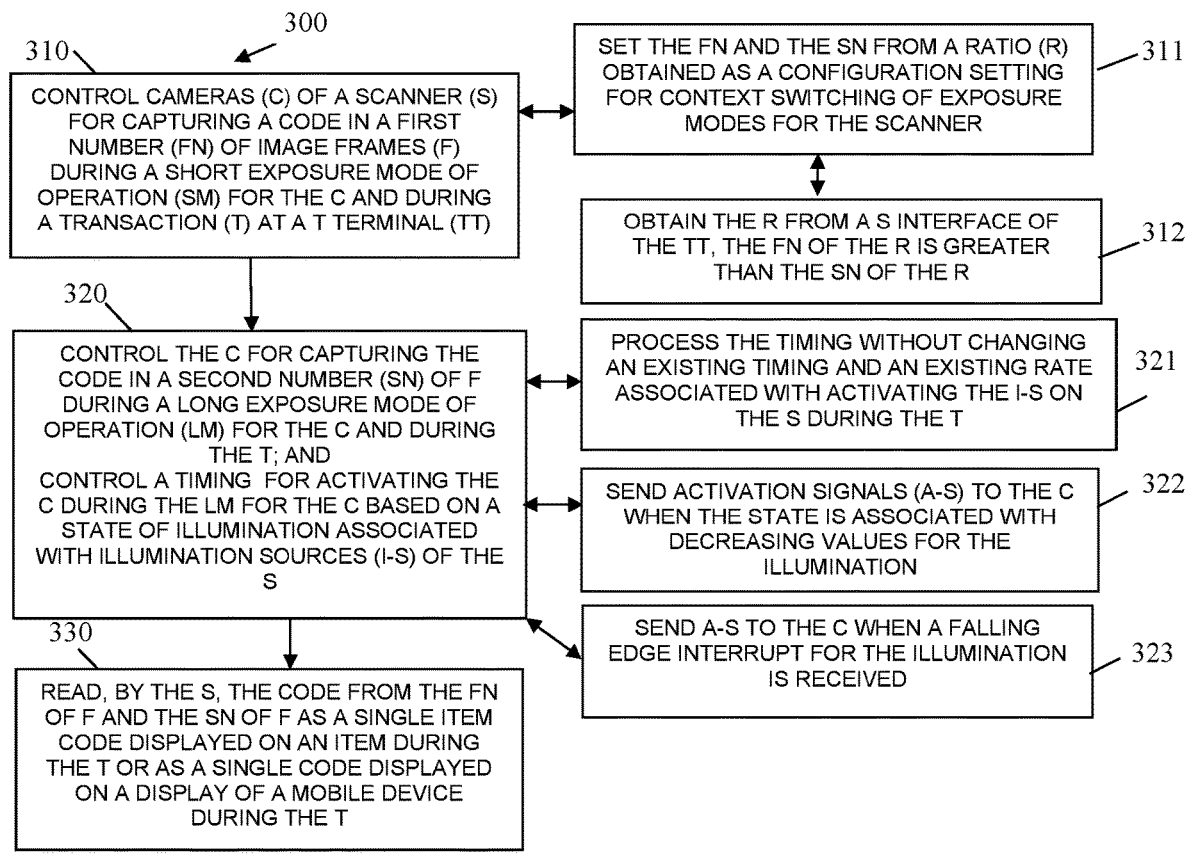
FIG. 3 is a diagram of another method for control over scanner context switching of exposure modes, according to an example embodiment.

FIG. 3 is a diagram of another method 300 for control over scanner context switching of exposure modes, according to an example embodiment. The software module(s) that implements the method 300 is referred to as a "scan manager." The scan manager is implemented as executable instructions programmed and residing within memory and/or a non-transitory computer-readable (processor-readable) storage medium and executed by one or more processors of a hardware device. The hardware processors that execute the scan manager are specifically configured and programmed to process scan manager. The scan manager may have or may not have access to one or more networks during its processing. Any network connection can be wired, wireless, or a combination of wired and wireless.

The scan manager presents another and, in some ways, an enhanced processing perspective of the FIG. 2.

In an embodiment, the device that executes the scan manager is the scanner 120.

In an embodiment, the scan manager is configuration manager 125, item scan manager 126, and/or method 200 of FIG. 2.

At 310, the scan manager controls cameras of a scanner for capturing a code in a first number of image frames during a short exposure mode of operation for the cameras and during a transaction at a transaction terminal.

In an embodiment, at 311, the scan manager sets the first number and a second number (see below for 320) from a ratio that is obtained as a configuration setting for context switching of exposure modes for the scanner.

In an embodiment of 311 and at 312, the scan manager obtains the ratio from a scanner interface of the transaction terminal. The first number of the ratio is greater than the second number of the ratio.

At 320, the scan manager controls the cameras for capturing the code in the second number of image frames during the long exposure mode of operation for the cameras and during the transaction. At 320, the scan manager further controls a timing for activating the cameras during the long exposure mode of operation for the cameras based on a state of illumination associated with illumination sources of the scanner.

In an embodiment, at 321, the scan manager processes the timing without changing an existing timing and without changing an existing rate associated with activating the illumination sources on the scanner during the transaction.

In embodiment, at 322, the scan manager sends activation signals to the cameras when the state is associated with decreasing values for the illumination.

In an embodiment, at 323, the scan manager sends activation signals to the cameras when a falling edge interrupt for the illumination is received on the scanner.

In an embodiment, at 330, the scan manager reads, on the scanner, the code from the first number of image frames and the second number of image frames as a single item code during the transaction or as a single code displayed on a display of a mobile device during the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
configuring cameras of a scanner to capture, by each camera, a first configurable number of image frames for codes during a short exposure mode of operation and a second configurable number of second image frames during a long exposure mode of operation; and
controlling activation signals sent to the cameras during the long exposure mode of operation, wherein each of the first number configurable number of image frames are captured each time shutters of the cameras open and close during the short exposure mode of operation and wherein the second configurable number of image frames are captured each time the shutters of the cameras open and close during the long exposure mode of operation.

2. The method of claim 1, wherein configuring further includes obtaining the first configurable number and the second configurable number as a ratio for context switching of exposure modes.

3. The method of claim 2, wherein obtaining further includes receiving the ratio from a scanner interface of a transaction terminal that is connected to the scanner for item code reading and mobile device displayed code reading during a transaction at the transaction terminal.

4. The method of claim 2, wherein obtaining further includes determining the ratio from a configuration barcode read by the scanner.

5. The method of claim 1, wherein configuring further includes setting the first configurable number to 5 and setting the second configurable number to 1.

6. The method of claim 1, wherein configuring further includes performing the configuring on a bioptic scanner comprising 3 cameras, wherein the scanner is the bioptic scanner.

7. The method of claim 1, wherein controlling further includes sending the activation signals based on a state of illumination associated with illumination sources of the scanner.

8. The method of claim 1, wherein controlling further includes sending the activation signals based on a timing associated with activation of illumination sources of the scanner.

9. The method of claim 1, wherein controlling further includes sending the activation signals upon receiving a falling edge interrupt for illumination associated with illumination sources of the scanner.

10. The method of claim 1, wherein controlling further includes sending the activation signals without changing existing illumination source activation signals for illumination sources of the scanner and without changing a rate by which the existing illumination source activation signals are sent to the illumination sources on the scanner.

11. The method of claim 1 further comprising, reading, by the scanner, the codes as item codes displayed on items and at least one mobile device code displayed on a display of a mobile device during a transaction at a transaction terminal that is connected to the scanner.

12. A method, comprising:
controlling cameras of a scanner for capturing a code in a first number of image frames during a short exposure mode of operation for the cameras and during a transaction at a transaction terminal, wherein controlling further includes capturing each of the first number of image frames each time shutters of the cameras open and close during the short exposure mode of operation; and
controlling the cameras for capturing the code in a second number of image frames during a long exposure mode of operation for the cameras and during the transaction wherein controlling further includes capturing each of second number of image frames each time the shutters of the cameras open and close during the long exposure mode of operation;
wherein controlling the cameras during the long exposure mode of operation for the cameras further includes controlling a timing for activating the cameras during the long exposure mode of operation for the cameras based on a state of illumination associated with illumination sources of the scanner.

13. The method of claim 12, wherein controlling the cameras during the short exposure mode of operation for the cameras further includes setting the first number and the second number from a ratio obtained as a configuration setting for context switching of exposure modes for the scanner.

14. The method of claim 13, wherein setting further includes obtaining the ratio from a scanner interface of the transaction terminal, wherein the first number of the ratio is greater than the second number of the ratio.

15. The method of claim 12, wherein controlling the cameras during the long exposure mode of operation for the cameras further includes processing the timing without changing an existing timing and an existing rate associated with activating the illumination sources on the scanner during the transaction.

16. The method of claim 12, wherein controlling the cameras during the long exposure mode of operation for the cameras further includes sending activation signals to the cameras when the state is associated with decreasing values for the illumination.

17. The method of claim 12, wherein controlling the cameras during the long exposure mode of operation for the cameras further includes sending activation signals to the cameras when a falling edge interrupt for the illumination is received.

18. The method of claim 12 further comprising, reading, by the scanner, the code from the first number of image frames and the second number of image frames as a single item code displayed on an item during the transaction or as a single code displayed on a display of a mobile device during the transaction.

19. A scanner, comprising:
cameras;
a processor;
a non-transitory computer-readable storage medium comprising executable instructions;
the executable instructions when executed by the processor from the non-transitory computer-readable storage medium cause the processor to perform operations comprising:
setting a first number of image frames that is to be captured by the cameras during a short exposure mode of operation for the cameras based on a configured ratio setting;
setting a second number of image frames that is to be captured by the cameras during a long exposure mode of operation for the cameras based on the configured ratio setting, wherein the first number of the configured ratio setting is greater than the second number of the configured ratio setting; and controlling activation of the cameras during the long exposure mode of operation for the cameras and during a transaction at a transaction terminal based on a falling edge interrupt received for illumination associated with illumination sources of the scanner;

wherein shutters for the cameras open and close a first number of times during the short exposure mode of operation and the shutters for the cameras open and close a second number of times during the long exposure mode of operation, each time a given shutter opens and closes a given image frame is captured by a corresponding camera.

20. The scanner of claim 19, wherein the cameras comprise three cameras, wherein the scanner is a bioptic scanner, and wherein the first number is 5 of the configured ratio setting is 5 and the second number of the configured ratio setting is 1.

\* \* \* \* \*